R. HIMENO.
ANTISKID DEVICE.
APPLICATION FILED DEC. 21, 1911.
1,030,238.
Patented June 18, 1912.
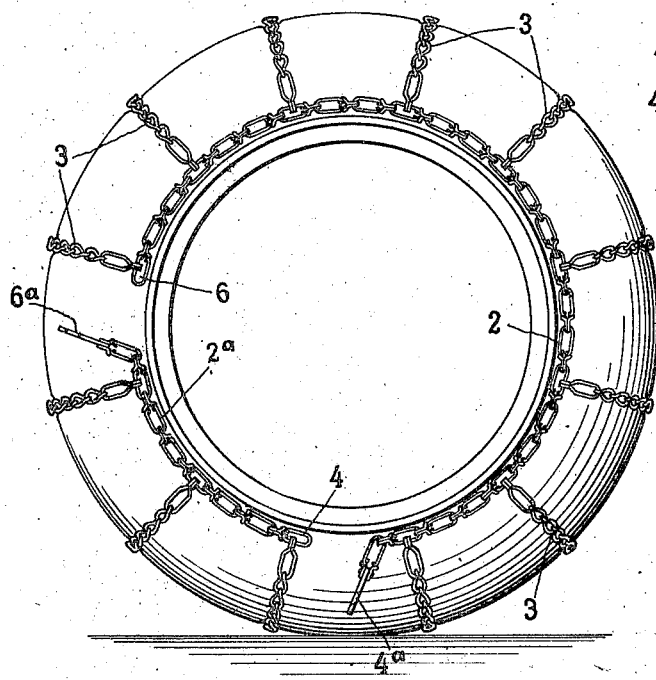
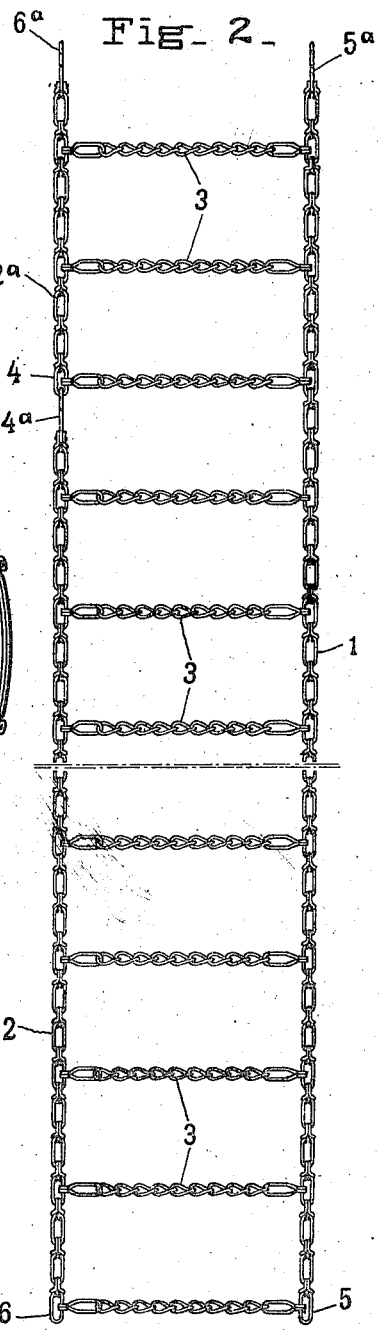
INVENTOR
Rikichy Himeno,
BY
ATTORNEY

UNITED STATES PATENT OFFICE.

RIKICHY HIMENO, OF NEW YORK, N. Y.

ANTISKID DEVICE.

1,030,238.  Specification of Letters Patent.  Patented June 18, 1912.

Application filed December 21, 1911. Serial No. 667,186.

*To all whom it may concern:*

Be it known that I, RIKICHY HIMENO, a subject of the Emperor of Japan, residing at 41 East Nineteenth street, borough of Manhattan, city of New York, N. Y., have invented a certain new and Improved Antiskid Device, of which the following is a specification.

My invention relates to so-called antiskid chains for use on vehicle wheels. These chains, as at present constructed, are comprised of two side-chains connected by transverse links which extend across the tread of the wheel. Suitable fastening devices are provided at each end of each side-chain, whereby the same may be applied to, or removed from, a wheel. In practice, however, it is necessary, in applying or removing the chain, either to raise the wheel from the ground or to roll the wheel over the chain while the latter is on the ground.

My invention comprehends an improvement in the chain construction whereby the same may be easily and quickly applied to a stationary wheel resting upon the ground.

In the drawings, Figure 1 is a side elevation of a vehicle wheel equipped with a pneumatic tire and with an anti-skid chain, embodying my improvement thereon, but not yet fully locked. Fig. 2 is a plan view of a detached chain shown in extended position.

1 represents the inner side-chain. 2—2ª represent the two sections of the outer side-chain. These two side chains are connected by cross-links 3—3. The intermediate ends of the two sections 2—2ª of the outer side-chain are provided with any suitable lock fastening clip, comprising the companion parts 4—4ª, which may be easily operated to attach or detach said two sections 2—2ª when the chain is in place upon the wheel. The extreme ends of both side-chains are provided with the usual companion fastening lock clips 5—5ª and 6—6ª respectively.

The method of applying the chain to the wheel is as follows: The several lock clips are opened and one end of the chain is passed inside of the wheel and under the axle, so that the point of division between the outer side chain sections 2—2ª will lie at a point where the wheel rests upon the ground. The companion clips 4—4ª are then connected after which the chains are draped upon the wheel, the ends brought together and the clips 5—5ª and 6—6ª fastened in a similar manner. It is obvious that this process can be reversed by first draping the chains over the wheel and fastening the clips 5—5ª and 6—6ª and afterward fastening the clips 4—4ª. Thus the chain may be assembled on the wheel without raising or moving the wheel. One or more extra links may be provided at the connecting points to facilitate the fastening of the parts but they are not necessary to the operation of my improvement herein described.

It will be seen that the feature of improvement whereby this new and expeditious method of assembling a tire chain upon a wheel is effected depends upon the presence of an opening in the outer side chain between the two ends thereof, said opening being bridged by a suitable lock clip which may be manually operated and which permits the two sections of the outer side-chain to be connected or disconnected and the chain adjusted or removed without raising or moving the wheel. Since such lock clips are now well known, many of which are suitable for use herein, they are shown in the drawings conventionally only and without detail.

The point of division between the two sections 2—2ª of the outer side chain is preferably nearer to one end of the chain than to the other, so that the two ends of the chain, considered as a whole, may be connected at the rear of the rear wheel, or at the front of the front wheel, while the balance of the chain rests upon the wheel in such a position that the break in the outer side-chain will lie adjacent to that point where the wheel rests upon the ground.

It should be understood that my use of the word "chain" herein is generic and that I intend said term to cover and include a chain specifically or any mechanical substitute or equivalent thereof.

What I claim is:—

An anti-skid device for wheels comprising two side-chains with means for connecting the ends thereof, a plurality of cross-links connecting said side-chains at intervals, one of said side-chains being separable at a point intermediate its length to divide said side-chain into two sections, and means to connect and disconnect said intermediate separated ends.

RIKICHY HIMENO.

Witnesses:
A. F. FULLER,
CHARLES A. MARTIN.